United States Patent [19]

Dickey

[11] Patent Number: 4,740,310

[45] Date of Patent: * Apr. 26, 1988

[54] CONTINUOUS PROCESS FOR CONTACTING COMPONENTS OF A FLUID MIXTURE

[76] Inventor: Leland C. Dickey, 3720 No. 106 Plz., Omaha, Nebr. 68134

[*] Notice: The portion of the term of this patent subsequent to Jul. 8, 2003 has been disclaimed.

[21] Appl. No.: 918,272

[22] Filed: Oct. 14, 1986

[51] Int. Cl.[4] ............... B01D 15/02; B01D 15/08
[52] U.S. Cl. ............... 210/649; 210/656; 210/670; 210/676; 55/34; 55/67; 55/77; 55/60
[58] Field of Search ............... 210/649, 656, 670, 676, 210/394, 198.2; 55/34, 651, 77, 60, 61

[56] References Cited

U.S. PATENT DOCUMENTS

| | | | |
|---|---|---|---|
| 3,236,768 | 2/1966 | Litt | 210/636 |
| 3,266,630 | 8/1966 | Litt | 210/394 |
| 3,482,701 | 12/1969 | Zaromb | 210/335 |
| 4,548,802 | 10/1985 | Dickey | 210/198.2 X |
| 4,548,803 | 10/1985 | Dickey | 210/198.2 X |
| 4,599,225 | 7/1986 | Dickey | 210/656 X |

OTHER PUBLICATIONS

Begovich, J. M. et al., "A Rotating Annular Chromatograph for Continuous Separations", Aiche Journal, vol. 30, No. 5, 9/1984, pp. 705-710.

*Primary Examiner*—Benoit Castel
*Attorney, Agent, or Firm*—Zarley, McKee, Thomte, Voorhees & Sease

[57] ABSTRACT

A continuous process for contacting components of a fluid mixture is described wherein at least one sorption zone is formed in a first separator. A sorbent material, which is in a continuous solid form, is passed through the sorption zone and then passed outwardly from the sorption zone. In the preferred process, a plurality of sorption zones are provided in the separator and a plurality of endless belts of sorbent material are passed through the sorption zones. The sorbent material is preferably a reversibly swellable material which swells as a result of contact with fluid in either the sorption or desorption zones and from which the nonsorbed fluid can be expressed during passage through the compression seal at the zone boundary.

5 Claims, 1 Drawing Sheet

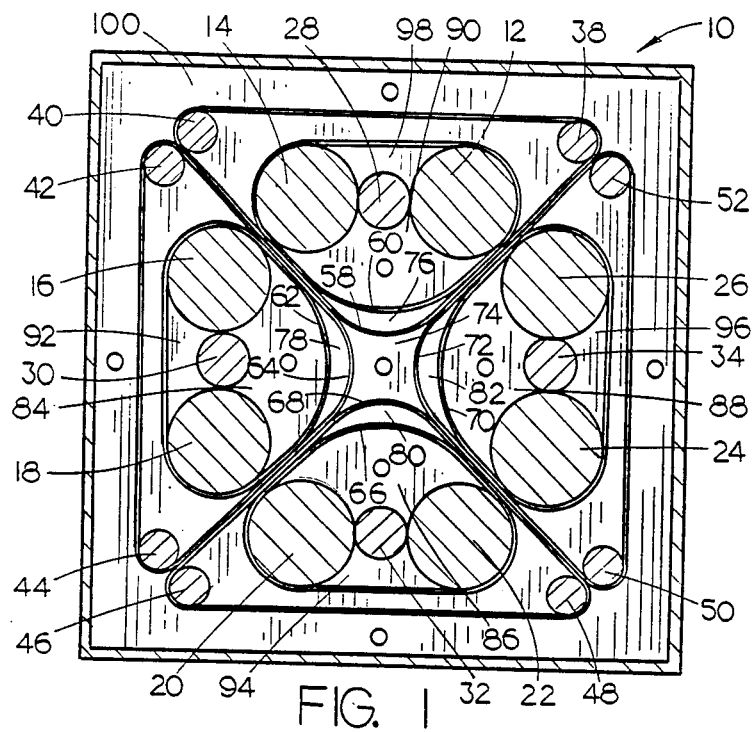
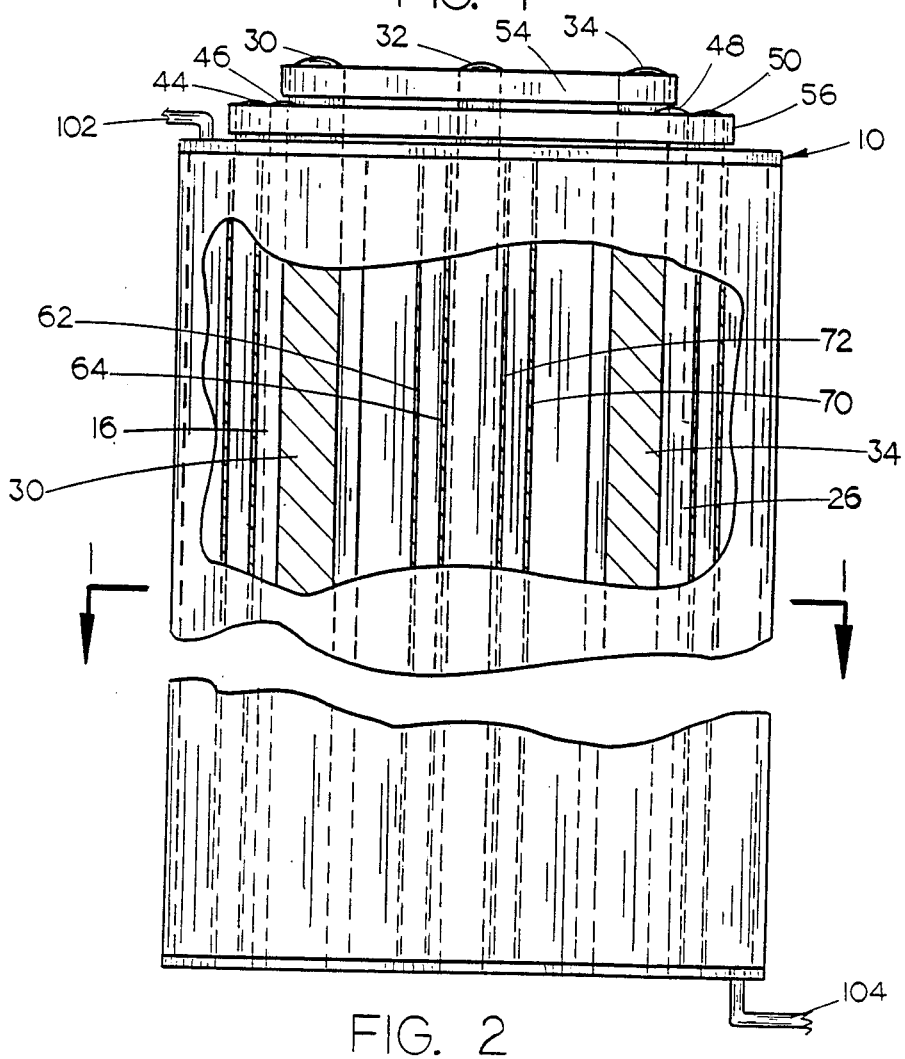

CONTINUOUS PROCESS FOR CONTACTING COMPONENTS OF A FLUID MIXTURE

BACKGROUND OF THE INVENTION

Methods utilizing adsorption to separate fluid mixtures are used commercially, for example, on fixed beds of granulated activated carbon or zeolite. It is believed that a majority of the prior art methods suffer from the drawback of being either a cyclic or batch process, in which the sorbent charge is depleted and must be replaced or regenerated after some use. For systems requiring continuous separation, a spare bed must be available for use during regeneration which often means a duplicate bed and nearly a doubling of capital cost for the separation.

One attempt to solve the problem of fixed beds is to utilize a continuous process such as the Dow Traveling Ion Exchange Bed or a rotating annular chromatograph as described in 30(5) AIChE J 705 (1984). Inherent in any continuous sorptive separation process is the use of a mechanism for moving the sorbent between the sorbing and desorbing (sorbent regeneration) zones. This aspect of sorptive separation was described in U.S. Pat. Nos. 4,548,802 and 4,548,803 which were entitled "Continuous Flow Separation With Moving Boundary Sorption". Math modeling studies of the processes described in these patents reveal it to be approximately competitive with current fixed bed processes. The modeling indicated that increased separation effectiveness would be achieved to the extent that boundary sorptive surface increased.

An effort to achieve greater sorptive surface than possible under the constraints of the moving boundary concept described in said patents led to the new and more comprehensive process concept of this invention. The process of this invention abandons the use of sorbent boundary-forming elements.

Standard sorbent materials have vast surface area per unit mass with smallest pore sizes in the nanometer range. This means that the sorbent atoms or molecules can attach sorbate molecules on almost a one-to-one basis. The drawback to use of these materials is that nearly all (99.999% or more depending on particle size) of the sorbent surface (sites) are internal. Time is required for the sorbate to get to these sites through the necessarily restrictive pores; desorption is similarly retarded so that removal of large or bulky molecules is not practical. As a consequence, sorptive beds are sized on the basis of providing enough holdup for the sorbate to diffuse to empty internal sites before leaving the bed. This results in relatively large beds or low flow rates compared to the case of equivalent external sorptive surface.

Since an external surface could be quickly saturated, it is practically mandatory that it be regenerated on a high frequency basis to take advantage of its accessibility advantage over porous sorbents; continuous regeneration is optimal allowing the minimum sorber size for a given application.

It is recognized that a means of preparing a mixture of solution of prescribed concentration, such as a pharmaceutical preparation, could be effected by the sorptive process. Likewise contacting fluid (say in the desorption zone) with a permanent catalyst-sorbent, or with reactant carried from the sorption zone—as a sorbate—could provide a means of controlling the rate of a chemical reaction, by controlling the sorbent velocity. Consequently, the invention is recognized in its most general aspect as a contactor which could, with appropriate modification, be used for any process in which change results from continuous sorptive treatment of a fluid by a solid.

It is therefore a principal object of the invention to provide an improved process for contacting components of a fluid mixture.

A further object of the invention is to provide a continuous process for contacting components in a fluid mixture with a reversibly swellable sorbent material, which is passed (unswollen) into a sorption or desorption zone so that the sorbent material, after passing through the zone, will swell to promote transfer of one of the components of the mixture to or from the sorbent material.

It is a further object of the invention to provide a continuous process for separating components of a fluid mixture wherein a swellable sorptive material is utilized which has the ability to swell to increase its sorptive transfer rate. The material will be such that de-swelling (removal of nonsorbed fluid components) will be accomplished by passage through the compression seal at the zone boundary.

These and other objects will be apparent to those skilled in the art.

BRIEF DESCRIPTION OF THE DRAWINGS

FIG. 1 is a cross-section of a desorption apparatus illustrating the use of several moving belts and rollers which define sorption and desorption zones; and FIG. 2 is a side elevational view of the apparatus of FIG. 1 with portions thereof cut away to more fully illustrate the invention.

SUMMARY OF THE INVENTION

The present invention relates to a continuous process for contacting components of a fluid mixture which comprises first forming at least one sorption zone and at least one desorption zone. The sorption and desorption zones are traversed by belts or foils of sorbent material which continuously move back and forth between the sorption and desorption zones. A fluid mixture is caused to flow into the sorption zone wherein the conditions are such to promote sorption of at least one of the components of the mixture by the sorbent material. Finally, conditions are created in the desorption zone such that the sorbed component will be desorbed when the sorbent material containing it moves into the desorption zone. The sorbent material is comprised of a reversibly swellable material such as cross-linked carboxy-methyl cellulose, cellulose and cross-linked starch, or other suitable sorbent material which will swell when immersed in the fluid mixtures so that increased contact is obtained between sorbent material and fluid.

DESCRIPTION OF THE PREFERRED EMBODIMENT AND PROCESS

Referring to the drawings, the numeral 10 designates a housing preferably having eight large elongated rollers 12, 14, 16, 18, 20, 22, 24 and 26 positioned therein in a rotatable fashion. Rollers 14 and 16 form a first pair of rollers, rollers 18 and 20 form a second pair, rollers 22 and 24 form a third pair, and rollers 26 and 12 form a fourth pair, each of the rollers in each pair being in rotatable engagement. A drive roller 28 is positioned between rollers 12 and 14 and is in rotatable engagement therewith. Similarly, drive rollers 30, 32 and 34 are in rotatable engagement with rollers 16 and 18, 20 and 22, and 20 and 26 respectively. Thus, rollers 12-34 form a boundary for a sorption zone. The numerals 38, 40, 42, 44, 46, 48, 50 and 52 refer to elongated drive rollers also rotatably positioned within the housing 10 and located outside the sorption zone bounded by rollers 12-34. As seen in FIG. 2, the ends of the rollers 30, 32 and 34 extend beyond the end of the housing 30. Although not shown in FIG. 2, the end of roller 28 also extends outwardly beyond the end of the housing 10 so that the rollers 28, 30, 32 and 34 may be simultaneously rotated by a suitable drive means such as drive belt 54. The ends of rollers 38, 40, 42, 44, 46, 48, 50 and 52 also extend beyond the end of the housing 10 so that the rollers may be suitably driven by a drive belt 56 or the like.

As seen in FIG. 1, an endless belt 58 extends around rollers 38 and 40 and extends between the first pair of rollers 14 and 16 and between the fourth pair of rollers 12 and 26. Belt 60 extends around rollers 12 and 14 and between the first pair of rollers 14 and 16 and the second pair of rollers 12 and 26. The apparatus is also provided with belts 62, 64, 68, 70 and 72 which are arranged on the various rollers and extends between the various pairs of rollers as illustrated in the drawings in a similar fashion to the arrangement of belts 58 and 60. As can be seen in the drawings, where more than one belt passes into the sorption zone through the same pair of rollers and leaves the sorption zone through the same pair of rollers, the belts are "nested" and spaced apart in a portion of their passage through the sorption zone.

The sorbent belts 58, 60, 62, 64, 66, 68, 70 and 72 form seals between the paired rollers between which they pass to create sorption zones 74, 76, 78, 80, 82, 84, 86, 88 and 90. The various rollers also define zones 92, 94, 96 and 98 which may be either sorption zones or desorption zones depending upon the construction of the manifold supplying the fluid mixture to the housing 10. The various rollers and belts also define a desorption zone 100 which is positioned between the interior surface of housing 10 and the exterior portions of the belts 76, 64, 68 and 72.

A suitable fluid inlet 102 is in communication with one end of the desorption zone 100. A fluid outlet 104 is in communication with the other end of the desorption zone 100. Although not shown, a plurality of inlets are provided at one end of the housing 10 which are in communication with one end of the sorption zones. Similarly, a plurality of fluid outlets are provided at the other end of housing 10 which are in communication with the other ends of the sorption zones so that the fluid mixture to be contacted with the sorbent belts or foils may be passed through the sorption zones.

The endless belts are comprised of a sorbent material and may be comprised of cross-linked cellulose, starch and cellulose, etc. As the sorbent belts enter the sorption zones through the various pairs of rollers previously described, the belts contact the fluid mixture passing through the sorption zones and the principal fluid component will swell the cross-linked polymer of which the belt is at least partially comprised. The swelling of the belts in the sorption zones will draw not only the main fluid mixture constituent or constituents but also the lower concentration species (sorbate) into intimate proximity to the sorbent. The belt material having the component sorbed thereon then passes outwardly through the pairs of rollers into the desorption zone where the sorbent belt material comes into contact with fluid which may cause the belt material to swell and causes a desorption of the component or components sorbed on the belts. The desorption fluid mixture, after picking up the component or components, then passes outwardly from the housing.

It can therefore be seen that the invention accomplishes at least all of its stated objectives.

I claim:

1. A continuous process for adsorbing at least one component from a fluid mixture, which comprises:
   (a) forming at least one sorption zone in a first separator, said at least one sorption zone being bounded by a plurality of drive rollers and pairs of rollers, the rollers of each said pair being in rolling contact and forming a compression seal therebetween, said drive rollers positioned between said pairs of rollers and in rolling sealed contact therewith;
   (b) passing sorbent material, which is in a continuous solid form, through a first said compression seal between a first pair of said pairs of rollers into said at least one sorption zone;
   (c) passing the sorbent material through said at least one sorption zone and outwardly from said at least one sorption zone through a second said compression seal between a second pair of said pairs of rollers.

2. The process of claim 1 wherein said sorbent material comprises an endless belt.

3. The process of claim 2 wherein a plurality of endless belts of sorbent material are provided and passed through said at least one sorption zone, thereby forming a plurality of sorption zones.

4. The process of claim 3 wherein each of said endless belts has opposite sides and wherein the belts are spaced away from one another in said sorption zones such that their opposite sides are brought into contact with the fluid mixture.

5. The process of claim 3, wherein all said belts which pass into said sorption zone through the same pair of rollers and out through the same pair of rollers are arranged in nested relation and are spaced apart from each other during a portion of their passage through said sorption zones.

* * * * *